United States Patent [19]

Shibatani et al.

[11] 3,926,480
[45] Dec. 16, 1975

[54] ANTI-SKID BRAKE CONTROL SYSTEM FOR VEHICLES

[75] Inventors: Juichi Shibatani; Toshiyuki Kondo, both of Toyota, Japan

[73] Assignees: Aisin Seiki Kabushiki Kaisha, Kariya; Toyota Jidosha Kogyo Kabushiki Kaisha, Toyota, both of Japan

[22] Filed: Dec. 23, 1974

[21] Appl. No.: 535,370

[30] Foreign Application Priority Data

Dec. 21, 1973 Japan .............................. 49-875[U]

[52] U.S. Cl. ............................. 303/21 F; 188/181
[51] Int. Cl.² ........................................... B60T 8/08
[58] Field of Search..... 188/181 A; 303/21 A, 21 B, 303/21 F, 21 FM, 21 FS, 21 FP, 21 R

[56] References Cited
UNITED STATES PATENTS

| | | | |
|---|---|---|---|
| 3,443,594 | 5/1969 | Frayer | 303/21 F |
| 3,682,513 | 8/1972 | Oberthur | 303/21 F |
| 3,702,713 | 11/1972 | Oberthur | 303/21 F |
| 3,829,169 | 8/1974 | Inada | 188/181 X |

Primary Examiner—Duane A. Reger
Attorney, Agent, or Firm—Finnegan, Henderson, Farabow & Garrett

[57] ABSTRACT

An anti-skid brake control system includes an actuator device having cut-off valve means provided in braking circuits between a master cylinder and wheel brake cylinders. A normally closed leak oil flow-preventing valve assembly is disposed between a reservoir and a spool valve type control device for controlling the hydraulic pressure applied to the actuator device. By said valve assembly, the pressure oil leaked from the control valve device during non-braking operation is prevented from flowing into the reservoir. During a braking operation, the leak oil flow-preventing valve assembly is opened due to the booster pressure or the braking pressure transmitted from the master cylinder. As a result, communication between the control valve device and the reservoir is rendered effective.

10 Claims, 7 Drawing Figures

ANTI-SKID BRAKE CONTROL SYSTEM FOR VEHICLES

This invention relates generally to an anti-skid brake control system for vehicles, and more particularly to an anti-skid brake control system having a control valve assembly which is adapted to control, in accordance with skid sensing signals indicating a wheel rotational condition, the hydraulic pressure supplied from a pump-powered hydraulic pressure source into an actuator device provided in hydraulic braking circuits.

Conventionally, in this type of anti-skid brake control system, a spool type valve is generally employed for the control valve assembly since the spool type valve is able to function regardless of the quantity of hydraulic fluid or the level of the pressure thereof.

In the spool valve, however, occurrence of hydraulic oil leakage through the interspace between the spool and the sleeve is structurally unavoidable. Although, accordingly, the interspace therebetween is required to be rendered as narrow as possible for the purpose of decreasing such oil leakage, said interspace is unable to be sufficiently narrowed because of the unavoidable failure to attain a desired precision in working the spool valve.

Accordingly, in the system provided with a closed hydraulic circuit adapted to permit a hydraulic pressure oil stored in an accumulator to be circulated therethrough, the foregoing oil leakage causes a large hydraulic pressure reduction whithin the hydraulic circuit during the period of non-braking operation, leading to a power loss within the system. As the result, the braking operation is rendered unstable. Further, for the purpose of preventing said hydraulic pressure reduction, the unloading valve is required to be frequently operated for maintaining the hydraulic pressure within the accumulator at a predetermined level. As a result, the durability of the unloading valve is also deteriorated.

The object of the invention is to provide a highly safened anti-skid brake control system capable of eliminating the above-mentioned drawbacks of the conventional system, removing the power loss during a non-braking operation, and being further manufactured inexpensively.

For achieving the above object, the anti-skid brake control system of the invention has the following characterizing construction.

A leak oil flow-preventing valve assembly is disposed in a hydraulic circuit line connecting a control valve assembly to a reservoir. Said leak oil flow-preventing valve assembly prevents a hydraulic oil leaked through the control valve assembly during a non-braking operation from flowing into the reservoir, thereby maintaining the hydraulic pressure within said circuit line at a predetermined level. Further, said leak oil flow-preventing valve assembly is supplied with a hydraulic pressure from a master cylinder or hydraulic booster during the braking operation, and thereby is hydraulically operated to open said circuit line only during the braking operation.

The anti-skid brake control system of the invention having the foregoing construction not only achieves the aforesaid object but also produces such various advantages or effects as are described below.

That is, since the present system produces no power loss during the non-braking operation, no pressure reduction within accumulators is caused even while the vehicle is allowed to stand, so that the braking action is highly safened. Further, since the unloading valve does not have to be frequently operated, the durability of the unloading valve, accordingly, the system as a whole is increased. Further, since the working precision between the spool and sleeve of a spool valve within the control valve assembly does not have to be strictly attained as desired, the working of the spool valve is facilitated. As a result, there can be reduced the manufacturing cost of the spool valve, accordingly, the system as a whole.

Further, the leak oil flow-preventing valve assembly used in the system of the invention is operated in accordance with the action of hydraulic pressure oil. As a result, the leak oil flow-preventing valve assembly is much simplified in its operation, and is more reduced in frequency of occurrence of valve troubles than, for example, an electrical signal-operated type valve, and further is decreased in manufacturing cost and yet high in reliability.

This invention can be more fully understood from the following detailed description when taken in conjunction with the accompanying drawings, in which.

Figure 1:
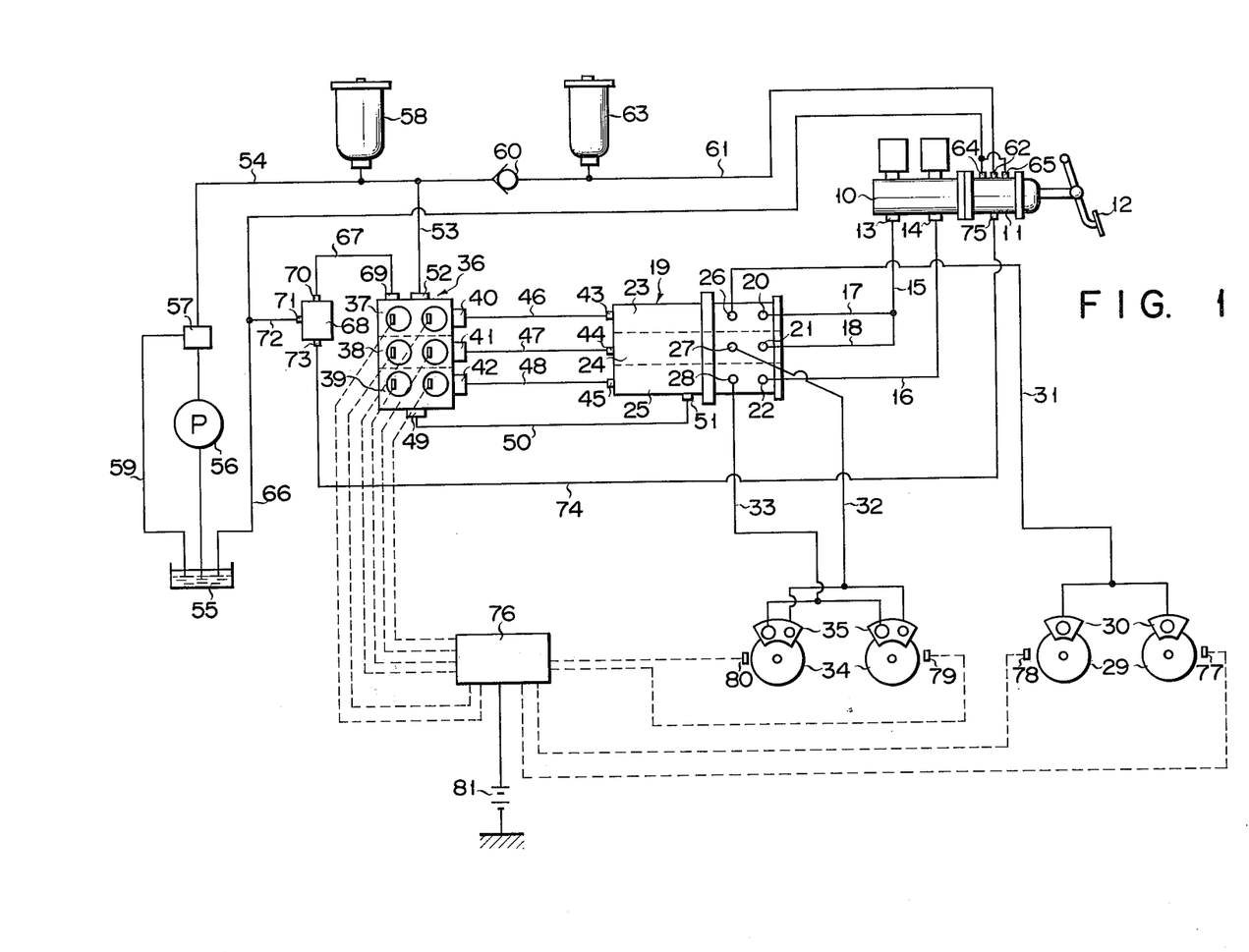
FIG. 1 is a schematic view of an anti-skid brake control system according to an embodiment of the invention.

In an anti-skid brake control system for vehicles according to the invention, illustrated in FIG. 1, a reference numeral 10 denotes a tandem type master cylinder for generating hydraulic brake pressure which has the conventional construction, and the detailed explanation of which inner construction is omitted. To the master cylinder 10 is connected a hydraulic booster 11 as later described in detail, through which a brake pedal 12 is operatively connected to the master cylinder 10. The ports 13 and 14 of the master cylinder 10 are connected to hydraulic lines 15 and 16, respectively. The line 15 is branched into two lines 17 and 18. The lines 16, 17 and 18 are connected to the inlet ports 22, 20 and 21, respectively, of an actuator device 19. The actuator device 19 is constructed of three actuators 23, 24 and 25 having the same construction, the inner construction of one 23 of which is later described in detail. An outlet port 26 of the actuator 23 is connected through a hydraulic line 31 to a pair of rear wheel brake cylinders 30, respectively, for a pair of rear wheels 29. The outlet ports 27 and 28 of the other two actuators 24 and 25 are connected through hydraulic lines 32 and 33, respectively, to a pair of front wheel brake cylinders 35, respectively, for a pair of front wheels 34.

When the brake pedal 12 is stepped-in for activation by an operator, the master cylinder 10 is operated through the booster 11, so that a hydraulic brake pressure is fe through the lines 15, 16, 17 and 18 into the actuators 23, 24 and 25 and then fed from the outlet ports 26, 27 and 28 of the actuators 23, 24 and 25 into the wheel brake cylinders 30 and 35 through the lines 31, 32 and 33. Thus, three systems of hydraulic braking circuits are provided between the master cylinder 10 and the wheel brake cylinders 30 and 35, and one of said hydraulic braking circuits is allotted to the rear wheels 29 while the other two are allotted to the front wheels 34.

Within the control valve device 36 are disposed three control valve assemblies 37, 38 and 39 having the same construction, the inner construction of one 37 of which is later described in detail. Respective ports 40, 41 and 42 of the control valve assemblies 37, 38 and 39 are hydraulically connected through lines 46, 47 and 48, respectively, to respective ports 43, 44 and 45 of the actuators 23, 24 and 25. A port 49 of the control valve device 36 is connected through a line 50 to a port 51 of the actuator device 19. To a port 52 of the control valve device 36 is connected a line 53 which communicates with a reservoir 55 through a line 54. For said line 54 are provided a pump 56, unloading valve 57 and an accumulator 58. Between the unloading valve 57 and the reservoir 55 is provided a bypass line 59. The accumulator 58 is stored with a hydraulic oil desiredly pressurized by the pump 56. The other end of the line 54 is connected through a check valve 60 to one end of a line 61, the other end of which is connected to a port 62 of the booster 11. For the line 61 is provided another accumulator 63. Two ports 64 and 65 of the booster 11 are connected to the reservoir 55 through a line 66.

The control valve device 36 is hydraulically connected through a line 67 to a leak oil flow-preventing valve assembly 68 as later described. That is, one end of the line 67 is connected to the port 69 of the control valve device 36 while the other end thereof is connected to an inlet port 70 of the valve assembly 68. An outlet port 71 of the leak oil flow-preventing valve assembly 68 is connected through a line 72 to the line 66. Accordingly, the port 71 always communicates with the reservoir 55. But, communication of the line 67 with the line 72 is normally prevented by the valve assembly 68. The remaining port 73 of the valve assembly 68 is connected through a line 74 to the port 75 of the booster 11.

A computer device 76 is electrically connected to sensors 77 and 78 for detecting the rotation condition of the rear wheels 29, and simultaneously to sensors 79 and 80 for detecting the rotation condition of the front wheels 34, as indicated by broken lines. Further, the computer device 76 is electrically connected to the respective control valve assemblies 37, 38 and 39 of the control valve device 36, as indicated by broken lines. A reference numeral 81 designates a conventional vehicle battery.

Figure 2:
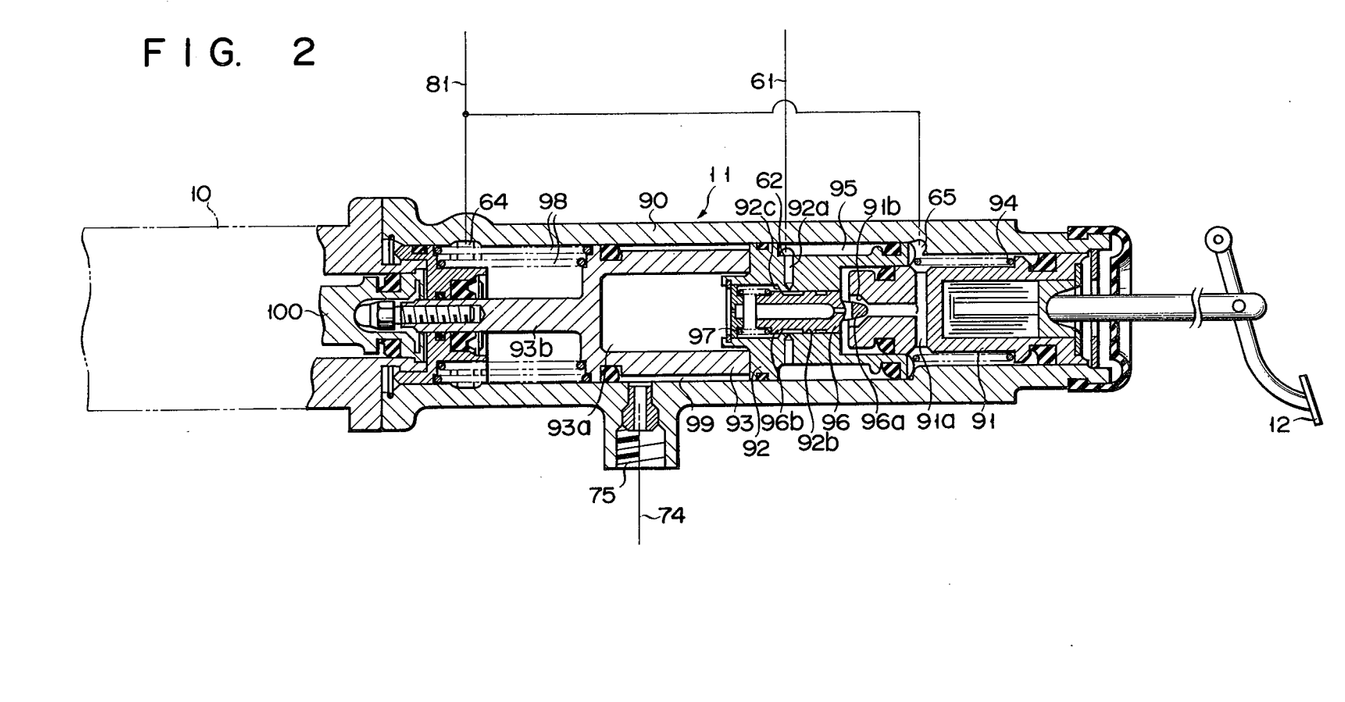
FIG. 2 is an enlarged side sectional view illustrating in detail the inner construction of a hydraulic booster used in the system illustrated in FIG. 1.

Referring to FIG. 2, within the housing 90 of the hydraulic booster 11 are sequentially disposed a first piston 91, second piston 92 and a power piston 93 in the axial direction of the housing 90. The first piston 91 is mechanically connected to the brake pedal 12. The first piston 91 is normally held at the illustrated position by springs 94. The first piston 91 has a passage 91a which is formed diametrically and axially of the first piston 91 and communicates with the port 65, and the left end face of the piston 91 is formed with a conical valve seat 91b connecting to the passage 91a.

The second piston 92 has a passage which is formed diametrically of the second piston 92 and communicates with the port 62 through an annular chamber 95. The passage 92a communicates with an inner hole 92b of the second piston 92. Within the inner hole 92b is slidably disposed a valve member 96 in a sealed condition, the right end of which is formed integrally with a conical valve portion 96a in abutment with the valve seat 91b of the first piston 91, and the neighbouring portion of the left end of which is formed integrally with a flange-shaped valve portion 96b at its outer periphery, said valve portion 96b having an inclined surface. The inner wall of the inner hole 92b of the second piston is formed with a valve seat 92c composed of a face so inclined as to oppose the flange-shaped inclined valve portion 96b. That is, the conical valve portion 96b and the valve seat 91b constitute first valve means while the valve portion 96b and the valve seat 92c constitute second valve means. Normally, the valve member 96 is urged by springs 97 toward the right, so that the second valve means if kept in a closed condition.

The booster power piston 93 is slidably disposed within the housing 90 in a sealed condition. The power piston 93 is urged by springs 98 so as to permit the right end face of the piston 93 to abut the left end face of the second piston 92. An annular chamber 99 around the power piston 93 communicates with the port 75. The left end portion 93b of the power piston 93 having a reduced diameter is mechanically connected to the push rod 100 of the master cylinder 10 indicated by two-dot chain lines of FIG. 2, said push rod 100 being partially shown only at its right end portion.

In the booster 11 having the foregoing construction, when the brake pedal 12 is stepped-in for activation, the first piston 91 is caused to slide toward the left against the biasing force of the springs 94 thereby causing the valve seat 91b to engage the valve portion 96a. That is, the first valve means is closed. The first piston 91 is further caused to slide thereby causing the valve member 96 to slide leftward within the inner hole 92b. As a result, the second valve means is opened. The hydraulic pressure oil stored in the second accumulator 63 is supplied into a booster power chamber 93a. Therefore, the power piston 93 is caused to slide leftward against the biasing force of the springs 98 thereby causing the left end portion 93b to urge the push rod 100 of the master cylinder 10, so that the master cylinder 10 is operated to cause a hydraulic braking pressure to be applied from the master cylinder 10 into the lines 15 and 16 through the two ports 13 and 14 of the master cylinder 10. Simultaneously, the pressure applied from the accumulator 63 into the booster power chamber 93a is applied from the chamber 93a to the port 75 through the annular chamber 99, and then is further applied into the line 74.

Figure 3:
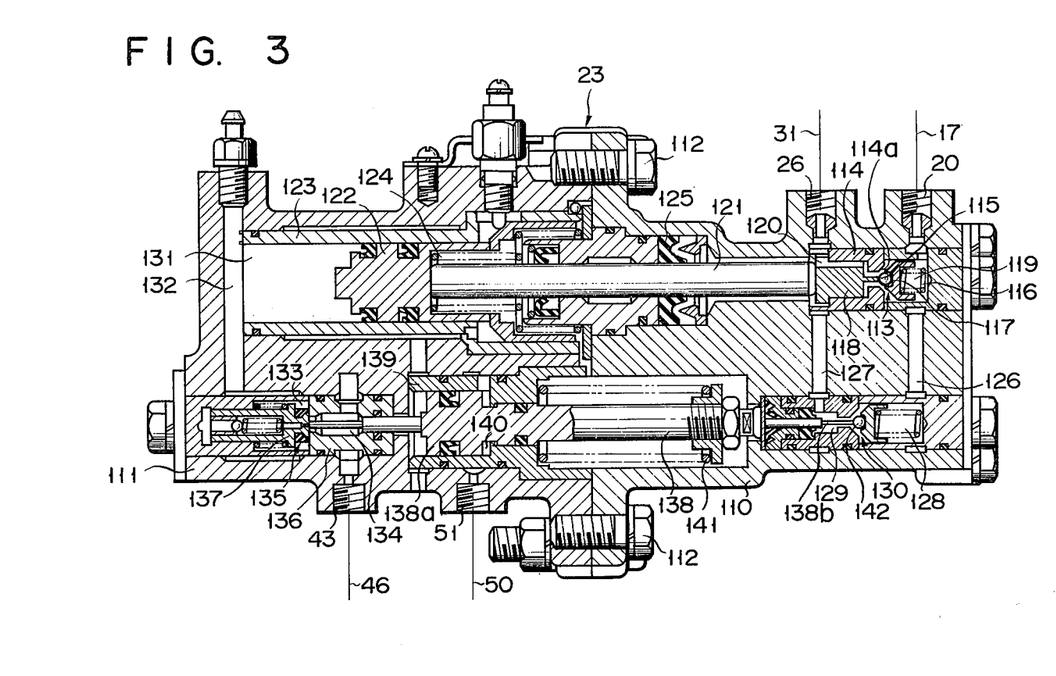
FIG. 3 is an enlarged side sectional view illustrating in detail the inner construction of one of actuator assemblies within an actuator device used in the system illustrated in FIG. 1.

In FIG. 3 there is illustrated in detail the inner construction of one 23 of the actuators provided within the actuator device 19 illustrated in FIG. 1. The actuator 23 has a first cylinder housing 110 and a second cylinder housing 111 secured thereto by a plurality of bolts 112. The first housing 110 is formed with said ports 20 and 26 while the second housing 111 is formed with said ports 43 and 51. It is to be noted here that the port 51 is used in common for the three actuators 23, 24 and 25.

Cut-off valve means 113 is provided for the hydraulic braking circuit between the ports 20 and 26. The cut-off valve means 113 includes a valve seat member 114 having at its central portion a hole for oil flow and a conical valve seat 114a formed at one end of said hole, a valve ball 115 facing the conical valve seat 114a, a retainer 117 for permitting the ball 115 to be always urged leftward by a spring 116, and a valve member 118 for abutting the ball 115 against the urging action of the retainer 117. The condition wherein the ball 115 is disengaged from the conical valve seat 114a as illustrated in FIG. 3 indicates that the cut-off valve means is opened whereas the condition wherein the ball 115 is engaged with said seat 114a indicates that the valve means 113 is closed. When the cut-off valve means 113 is opened, a hydraulic braking pressure oil supplied into the hydraulic chamber 119 through the line 17 and the port 20 flows into a pressure reducing chamber 120, and thus the braking pressure is applied into the brake cylinders 30 through the port 26 and line 31. When the cut-off valve means 113 is closed, the braking pressure is not applied into the wheel brake cylinders 30.

The valve member 118 is connected to the right end of an elongated pressure reducing piston 121. To the left end of the piston 121 is connected a large diameter power piston 122, which is slidably disposed within a power cylinder 123 in a sealed state and always biased or urged leftward by springs 124. At the outer periphery of the right end portion of the pressure reducing piston 121 is formed an annular chamber, which constitutes part of the pressure reducing chamber 120. The chamber 120 is defined at its left end by a seal member 125 in a state sealed thereby.

The hydraulic chamber 119 and the pressure reducing chamber 120 communicate, respectively, with lower hydraulic chambers 128 and 129 through a vertical passage 126 and another vertical passage 127, respectively. Between the chambers 128 and 129 there is provided bypass valve means 130 for controlling the hydraulic communication between both chambers 128 and 129. The bypass valve means 130 has a construction similar to that of the cut-off valve means 113, as illustrated in FIG. 3.

A power chamber 131 within the power cylinder 123 communicates at its left end with a passage 132 formed in the second housing 111. The lower end of the passage 132 communicates with a hydraulic chamber 133. Between the chamber 133 and a hydraulic chamber 134 connecting to said port 43 is provided lock valve means 135 for controlling the hydraulic communication between both chambers 133 and 134. The lock valve means 135 includes a valve seat member 136 and a valve member 137 facing to the valve seat member 136. The valve member 137 is connected to the left end of a stepped safety piston 138. The substantially central portion of the safety piston 138 is formed with a power piston portion 138a which is largest in diameter of all other piston portions. The power piston portion 138a is slidably fitted, in a sealed state, into a cylinder 139 mounted within the second housing 111. A rightward hydraulic cylinder chamber 140 defined by the piston portion 138a connects to the port 51. The safety piston 138 is urged toward the right by a spring 141. Accordingly, when a pressure fed from the accumulator 58 is not applied into the hydraulic cylinder chamber 140 through the line 50 and port 51, the lock valve means 135 is in a closed condition. Therefore, reduction of pressure within the power chamber 131 is prevented.

The right end portion of the safety piston 138 is formed into a small diameter valve member portion 138b for abutting a valve ball 142 constituting one component of the bypass valve means 130, and arrangement is so made that when the lock valve means 135 is closed, the bypass valve means 130 is opened, and that when the lock valve means 135 is opened, the bypass valve means 130 is closed. That is, both the valve means 130 and 135 are alternately opened or closed in accordance with the sliding movement of the piston 138.

It is to be noted here that although, in FIG. 3, the actuator 23 only is illustrated, the remaining two actuators 24 and 25 also have the same inner construction.

Figure 4:
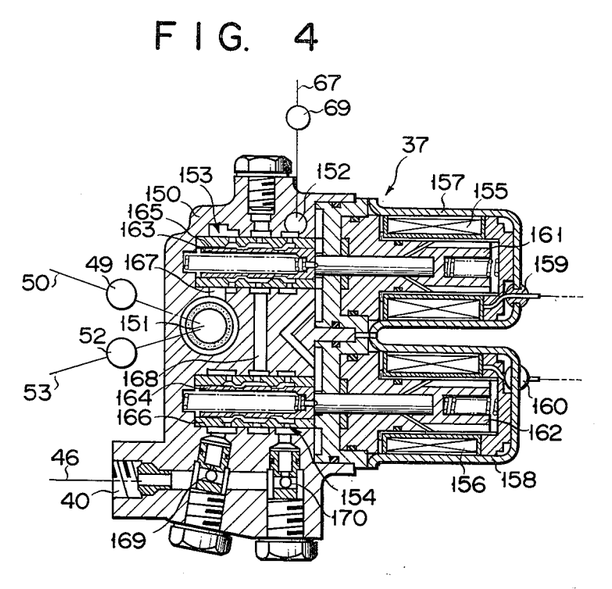
FIG. 4 is an enlarged sectional view illustrating in detail the inner construction of one of control valve assemblies within a control valve device used in the system illustrated in FIG. 1.

In FIG. 4, there is illustrated in detail the inner construction of one 37 of the three control valve assemblies constituting the control valve device 36 illustrated in FIG. 1. The control valve assembly 37 has a housing 150 common to the three assemblies 37, 38 and 39, said housing 150 being formed with said port 40 and hydraulic passages 151 and 152. One passage 151 is penetrated through the three assemblies 37, 38 and 39 of the control valve device 36, and the upper end of the passage 151 connects to said port 52 while the lower end thereof connects to said port 49. The other passage 152 is formed into an elongate groove configuration, and is also made common to the three assemblies 37, 38 and 39. The passage 152 is closed at one end and opened at the other end. The open end of the passage 152 connects to said port 690 of the control valve device 36.

The control valve assembly 37 has two juxtaposed electromagnetic spool valve means 153 and 154. One spool valve means 153 is of a directional control valve type for charging-over the flow direction of a hydraulic oil whereas the other spool valve means 154 is of an orifice valve type for varying the quantity of hydraulic oil flow per unit length of time, i.e., the speed of hydraulic oil flow. Both the spool valve means 153 and 154 have solenoid coils 155 and 156, respectively, which are electrically connected to said computer device 76 through terminals 159 and 160 fixedly provided for casings 157 and 158, respectively. It is to be noted that said casings 157 and 158 are mounted onto the housing 150. The spool valve means 153 and 154 have axially reciprocable plungers 161 and 162, respectively, to the left ends of which are secured spools 163 and 164, respectively. The spools 163 and 164 are slidably disposed within cylindrical sleeves 165 and 166, respectively. The plungers 161 and 162 of the spool valve means 153 and 154 are located, respectively, at the illustrated positions in which the plungers have been moved up to the extreme right end. At this time, the respective solenoid coils 155 and 156 are in a state not excited.

In the condition illustrated in FIG. 4, the directional control spool valve means 153 permits a hydraulic pressure oil introduced from the accumulator 58 into the passage 151 through the port 52 to be supplied through a short passage 167 communicating with the passage 151 into a passage 168 vertical formed in the housing 150, and simultaneously prevents the hydraulic pressure oil from flowing from the passage 167 into the passage 152. The vertical passage 168 communicates with the orifice valve means 154, and, in the condition illustrated in FIG. 4, the hydraulic pressure oil supplied through the passage 168 flows into that orifice 169 of the valve means 154 the flowing path of which is small in cross sectional area, and then flows out into the line 46 through the port 40. When the plunger 161 of the valve means 153 has changed in position from the extreme right end to the extreme left end due to the excitation of the solenoid coil 155, communication of the passage 168 with the passage 151 is shut off and simultaneously communication of the passage 168 with the passage 152 is rendered effective. As a result, the hydraulic pressure oil within the passage 168 flows into the passage 152 and then flows through the port 69 into the line 67. The last mentioned operational manner will be later described in more detail.

When the plunger 162 of the orifice valve means 154 has changed in position from the extreme right end to the extreme left end due to the excitation of the solenoid coil 156, the passage 168 is permitted to communicate with an orifice 170 the flowing path of which is larger in cross sectional area than the flowing path of said orifice 170. Thus, the flow of the hydraulic pressure oil is rendered more speedy.

It is to be noted here that the hydraulic pressure oil introduced from the accumulator 58 into said passage 151 through the port 52 not only flows into the passage 167 but also flows into the line 50 through the port 49 and thus is fed into the port 51.

Figure 5:
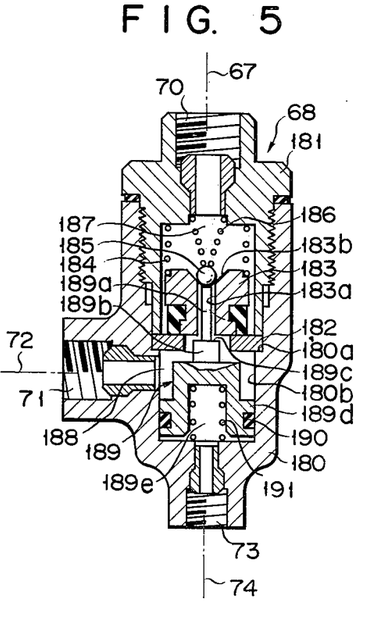
FIG. 5 is an enlarged longitudinal sectional view illustrating in detail the inner construction of a leak oil flow-preventing valve assembly used in the system illustrated in FIG. 1.

In FIG. 5, there is illustrated in detail the inner construction of the leak oil flow-preventing valve assembly 68. This valve assembly has a first housing 180 and a second housing 181 secured thereinto and thus rendered intergral therewith. The lower end portion of the first housing 180 is formed with said port 73 communicating with the line 74 while the side portion thereof is formed with said port 71 communicating with the line 72. Further, the upper end portion of the second housing 181 is formed with said port 70 communicating with the line 67. The interior of the first housing 180 is formed with a stepped portion 180a, on which is mounted a valve seat 182. The valve seat 182 is pressed onto the stepped portion 180a by the lower end of the second housing 181 so as to firmly engage the stepped portion 180a. A main valve member 183 is urged by a spring 184 so as to engage the valve seat 182. The central portion of the main valve member 183 is formed with a through hole 183a, the upper end opening portion of which is formed with a conical surface 183b. A valve ball 185 is urged by a spring 186 so as to engage the conical surface 183b. A combination of the main valve member 183 and valve seat 182 constitutes a normally closed main valve means while another combination of the conical surface 183b and valve ball 185 constitutes a normally closed auxiliary valve means. By these two valve means a space formed within a combined unit of the housings 180 and 181 is divided into two parts, one of which is an upper hydraulic chamber 187 connecting to the port 70 and the other of which is a lower hydraulic chamber 188 connecting to the port 71. Within the lower hydraulic chamber 188 is disposed a valve actuating piston 189, which has at its uppermost end portion a small diameter projecting portion 189a and at its intermediate portion an actuating portion 189b whose diameter is slightly larger than said portion 189a. The projecting portion 189a is loosely inserted into the through hole 183a of the main valve member 183, and the upper end of the portion 189a engageably opposes the valve ball 185. The shoulder surface 189c of the actuating portion 189a faces the underside of the main valve member 183. The largest diameter portion 189d of the actuating piston 189 is slidably and tightly inserted into the inner peripheral wall 180b of the first housing 180. A single ring-like sealing member 190 is fitted into the outer peripheral wall of said largest diameter portion 189d for the purpose of preventing occurrence of an oil leakage at the interspace between said inner peripheral wall 180b and the outer peripheral wall of said largest diameter portion 189d. The actuating piston 189 is formed with an actuating chamber 189e which is downwardly opened. Within the chamber 189e is disposed a spring 191 having a weak biasing force, said spring 191 upwardly urging the piston 189. Under a condition in which no hydraulic pressure is applied into the chambers 187, 188 and 189e, however, the projecting portion 189a does not go so far as to push up the valve ball 185 owing to the action of the spring 191.

The lower chamber 188 of the valve assembly 68 having the foregoing construction communicates with the reservoir 55 through the port 71, line 72 and line 66. Therefore, no hydraulic oil pressure is applied into the chamber 188. On the other hand, a leak oil is entered from the control valve device 36 into the upper chamber 187 through the line 67 and port 70. Therefore, some level of oil pressure is applied into the upper chamber 187. The reason is that since, as previously mentioned, spool type valves 153 and 154 are employed for the control valve assemblies 37, 38 and 39 within the control valve device 36, occurrence of oil leakage at the interspaces between the spools and sleeves can not be avoided. There will now be described the manner in which oil leakage is effected, by reference to FIG. 4. When the directional control valve means 153 is situated at a normal position of FIG. 4, a pressure oil introduced from the accumulator 58 into the sleeve 165 through the passages 151 and 157 and the spool 163 is prevented by the action of the valve means 153 from flowing into the passage 152 communicating with the line 67. Actually, however, said pressure oil flows out into the passage 152 by passing through a small interspace existing, as resulting from the unavoidable failure to attain the desired precision between the spool 163 and the sleeve 165. Such oil leakage occurs also at the orifice valve means 154, and a pressure oil leaked therethrough also flows out into the passage 152. The leak oil collected in the passage 152 is entered into said upper chamber 187 as previously mentioned. Accordingly, the interior of the chamber 187 is substantially applied with a pressure from the accumulator 58.

The leak oil flow-preventing valve assembly 68 is characterized in that it functions completely to prevent, by the aforesaid normally closed first and second valve means, the leak oil caused to flow into the upper chamber 187 from being introduced into the line 72 communicating with the reservoir 55. It is to be noted that communication of the line 67 with the line 72 is rendered ineffective only during the period in which the braking operation is not carried out whereas, during the period in which the braking operation is performed, communication of the line 67 with the line 72 is rendered effective by opening of said first and second valve means.

There will now be described the operation and action of the anti-skid brake control system having the foregoing construction.

When the vehicle is started, the two accumulators 58 and 63 are stored by the pump 56 with a hydraulic pressure oil subjected to a desired pressure. The pressure oil of one accumulator 63 is supplied solely into the booster 11 through the line 61 and the port 62. The pressure oil of the other accumulator 58 is supplied into the passage 151 through the lines 54 and 53 and the port 52. The pressure oil within the passage 151 is supplied from the ports 40, 41 and 42, respectively, of the control valve assemblies 37, 38 and 39 into the ports 43, 44 and 45, respectively, of the actuators 23, 24 and 25 through the lines 46, 47 and 48. Further, the pressure oil within the passage 151 is supplied from the port 49 to the common port 51 of the control device 19 through the line 50. To explain about the actuator 23 only, therefore, the safety piston 138 is operated to cause the lock valve means 135 to be opened with the result that the bypass valve is closed. For this reason, the accumulator pressure oil previously supplied into the port 43 is allowed to pass through the lock valve means 135 and passage 132 into the power chamber 131. As a result, the power piston 122 is caused to slide toward the right against the biasing force of the spring 124 to permit the cut-off valve means 113 to be opened, so that the line 17 is allowed to communicate with the line 31. The same explanation applies to the remaining two actuators 24 and 25.

Next, explanation is made of the control valve device 36. Since, with respect to the control valve assembly 37, the solenoid coil 155 of the directional control spool valve means 153 is not excited, communication of the passages 151 and 167 with the passage 152 is rendered ineffective. As previously mentioned, however, the pressure oil leaked through the spool valve means 153 and 154 is introduced into the passage 152, and then passes through the port 69 and line 67 into the upper chamber 187 of the valve assembly 68. Since, however, the first and second valve means of the valve assembly 68 are in a closed state, the leak oil does not flow into the line 66 communicating with the reservoir 55. Accordingly, it never happens that the pressure imparted to the hydraulic pressure oil by the accumulator 58 is decreased due to an oil leakage during the travel of the vehicle.

When the brake pedal 12 has been stepped-in for activation by the operator, the braking operation starts to be performed. At this time, the hydraulic pressure transmitted from the accumulator 63 causes the booster 11 to be operated thereby to permit the master cylinder 10 to be operated. As a result, a hydraulic braking pressure is generated. This hydraulic braking pressure is transmitted from the ports 13 and 14 into the ports 20, 21 and 22, respectively, of the three actuators 23, 24 and 25 through the lines 15, 16, 17 and 18. Since, at this time, the cut-off valve means of each actuator is in a closed state, the braking pressure is transmitted from the ports 26, 27 and 28 into the rear wheel cylinders 30 and front brake cylinders 35 through the lines 31, 32 and 33. Thus, the braking pressure is applied to the rear and front wheels 29 and 34.

Simultaneously with the starting of the foregoing braking operation, a booster pressure is transmitted from the port 75 of the booster 11 into the actuating chamber 189e through the line 74 and the port 73 of the leak oil flow-preventing valve assembly 68. For this reason, the actuating piston 189 is caused to upwardly slide to cause the projecting portion 189a to upwardly push the valve ball 185 with the result that the ball 185 is disengaged from the conical surface 183b. Since, accordingly, the upper chamber 187 is allowed to partially communicate with the lower chamber 188 through the through hole 183a of the main valve member, the pressure within the upper chamber 187 is decreased. As a result, the actuating piston 189 is further raised to cause the shoulder surface 189c of the actuating portion 189b to abut the underside of the main valve member 183, thereby causing the valve member 183 to be disengaged from the valve seat 182 against the biasing force of the spring 184. Namely, a valve-opened condition is achieved. Resultantly, communication of the upper chamber 187 with the lower chamber 188 is rendered fully effective.

When, during the foregoing braking operation, the wheels 29 and 34 are locked, for example, by slipping on the road surface, electrical signals are sent from the sensors 77 and 78 and 79 and 80 corresponding to the wheels 29 and 34, respectively, into the computer device 76. Upon receipt of the electrical signals from said sensors, the computer device 76 sends skid sensing signals to the respective solenoid coils of the directional control valve means 153 and orifice valve means 154 of each control valve assembly 37, 38 and 39, thereby exciting said respective solenoid coils. To explain about the control valve assembly 37, the respective plungers 161 and 162 of said two valve means 153 and 154 are moved to the left. As a result, the pressure oil within the power chamber 131 of the actuator 23 is fed back into the port 40 through the passage 132, lock valve means 135, port 43 and line 46. The pressure oil thus introduced into the port 40 passes through the orifice 170 whose opening has a larger cross sectional area, and then more speedily flows through the passage 168 into the passage 152, and then flows through the port 69 and line 67 into the port 70. Since, at this time, the valve means of the leak oil flow-preventing valve assembly 68 is in a completely closed condition, the pressure oil thus introduced into the port 70 escapes into the port 71, and thus fed back into the reservoir 55 through the lines 72 and 66. As a result, the pressure within the power chamber of the actuator 23 is decreased and therefore the power piston 122 is caused to slide leftward due to the biasing force of the spring 124, thereby closing the cut-off valve means 113. For this reason, communication of the line 17 with the line 31 is interrupted. The resultant pressure reduction within the pressure reducing chamber 120 causes the braking operation of the rear wheel brake cylinders 30 to be moderated with the result that the locked condition of the wheels 29 is released. Also with respect to the front wheels 34, release of their locked condition is effected in the same manner as in the case of the wheel 29.

Figure 6:
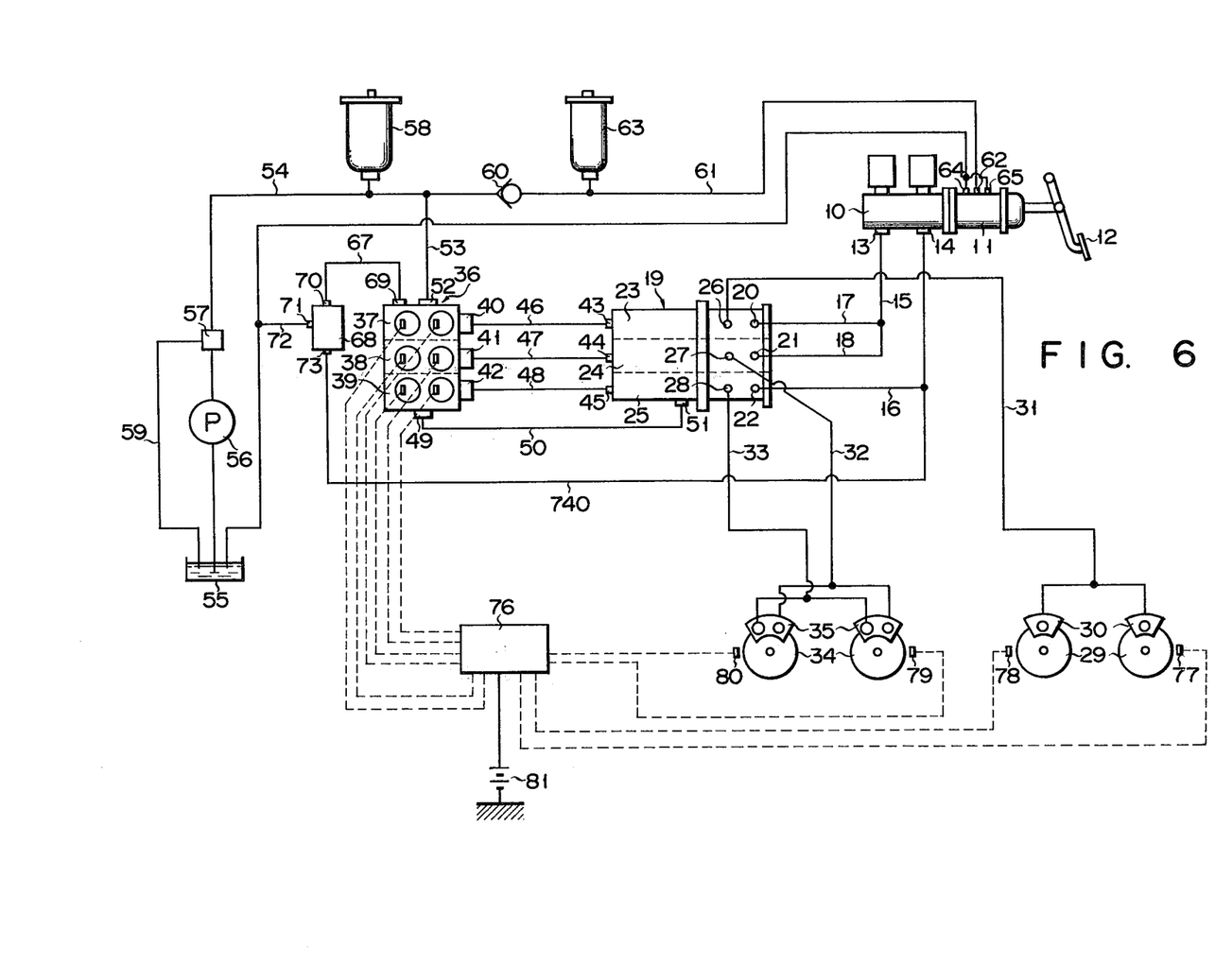
FIG. 6 is a schematic view of an anti-skid brake control system according to another embodiment of the invention.

An anti-skid brake control system according to a second embodiment of the invention illustrated in FIG. 6 is for the most part the same as the first embodiment illustrated in FIG. 1. Therefore, the same parts and sections as those of the first embodiment are denoted by the same reference numerals and the detailed description thereof is omitted.

Figure 7:
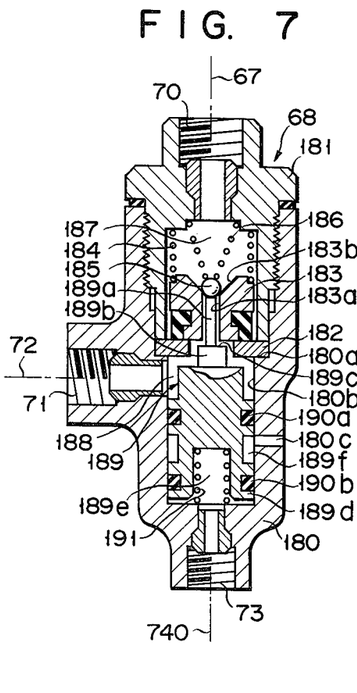
FIG. 7 is an enlarged longitudinal sectional view illustrating in detail the inner construction of a leak oil flow-preventing valve assembly used in the system illustrated in FIG. 6.

The respect distinguishable from the first embodiment resides in that, during the braking operation, braking pressure is applied into the actuating chamber 189e of the leak oil flow-preventing valve assembly 68 whose inner construction is illustrated in detail in FIG. 7. In association with this distinguishable respect, the construction of the valve assembly 68 is partially distinguished from that illustrated in FIG. 5.

A line 740 is connected at one end to the port 73 of the valve assembly 68 and connected at the other end to the line 16. Accordingly, a braking pressure generated from the master cylinder 10 is applied through the port 14, line 16, line 740 and port 73 into the actuating chamber 189e.

The leak oil flow-preventing valve assembly 68 illustrated in FIG. 7 is distinguished from that illustrated in FIG. 5 in that two sealing members 190a and 190b fitted in the largest diameter portion 189d of the actuating piston 189 are in a predetermined distance from each other; an annular recess 189f for oil reception is formed at the outer peripheral wall of said largest diameter portion; and the portion of the first housing 180 corresponding to said annular recess 189f is formed with an aperture 180c for oil discharge opened to the exterior. Even if, therefore, the braking pressure oil within the actuating chamber 189e is leaked into the interspace between the outer peripheral wall of said largest diameter portion 189d of the piston and the inner peripheral wall 180b of the housing 180, such leak oil will be received in the recess 189f and then discharges through the aperture 180c into the exterior. For this reason, the braking pressure oil is prevented from flowing out into the lower chamber 188 and being thus mixed with another hydraulic oil within the chamber 188. In addition, the second embodiment is further distinguished from the first embodiment in that the port 75 for taking out the booster pressure provided for the booster of the first embodiment is not provided for the booster 11.

The operation of the system according to the second embodiment is performed in the same manner as in the case of the first embodiment, and therefore the explanation thereof is omitted.

What we claim is:

1. An anti-skid brake control system for vehicles comprising:
   a. a master cylinder for generating a hydraulic brake pressure;
   b. wheel brake cylinders;
   c. a hydraulic braking circuit connecting said master cylinder to said wheel cylinders, for supplying, during a braking operation, the hydraulic brake pressure from said master cylinder into said wheel cylinder;
   d. cut-off valve means disposed in said hydraulic braking circuit and interposed between said master cylinder and said wheel cylinders to control the hydraulic communication therebetween;
   e. a hydraulic brake pressure reducing means disposed in said hydraulic braking circuit and interposed between said cut-off valve means and said wheel cylinders and cooperatively connected to said cut-off valve means;
   f. a pump-powered hydraulic pressure source;
   g. a reservoir hydraulically connected to said pump-powered hydraulic pressure source;
   h. means for generating a skid sensing signal;
   i. a first hydraulic line for permitting said pump-powered hydraulic pressure source to hydraulically communicate with said hydraulic brake pressure reducing means;
   j. a control valve assembly disposed in said first hydraulic line, for controlling the hydraulic communication between said pump-powered hydraulic pressure source and said hydraulic brake pressure reducing means in response to said skid sensing signal;
   k. a second hydraulic line for permitting said control valve assembly to hydraulically communicate with said reservoir; and
   l. a leak oil flow-preventing valve assembly disposed in said second hydraulic line and hydraulically operated, in accordance with the condition of the braking operation, to open said second hydraulic line so as to render effective the hydraulic communication between said control valve assembly and said reservoir only during the braking operation and to close said second hydraulic line during the non-braking operation;

wherein, during the non-braking operation, a leak oil flowing into said second hydraulic line from said control valve assembly is prevented by said leak oil flow-preventing valve assembly from flowing further into said reservoir.

2. An anti-skid brake control system for vehicles according to claim 1, wherein said leak oil flow-preventing valve assembly includes a housing having first and second ports formed therein, said first port connecting to said control valve assembly through said second hydraulic line, said second port connecting to said reservoir through said second hydraulic line, a valve member disposed in said second hydraulic line and interposed between said first and second ports of said housing, a piston slidably disposed within said housing, and a sealing member for preventing occurrence of hydraulic oil leakage at the interspace between said piston and said housing, whereby, during the braking operation said piston is caused to slide to permit said valve member to open said second hydraulic line.

3. An anti-skid brake control system for vehicles according to claim 2, wherein said valve member has a through hole and a conical valve seat formed at one opening end of said through hole; a spring biased valve ball in engagement with said valve seat is disposed within said housing; said piston has a small diameter projecting portion and an actuating portion which is adjacent to and larger in diameter than said small diameter projecting portion, said projecting portion being loosely inserted into said through hole of said valve member, whereby when the piston sliding is effected in accordance with the braking operation, said projecting portion first permits said valve ball to be disengaged from said conical valve seat and then a shoulder portion of said actuating portion is permitted to engage with said valve member, thereby to actuate said valve member.

4. An anti-skid brake control system for vehicles according to claim 1, wherein, during the braking operation, said leak oil flow-preventing valve assembly is supplied with a hydraulic brake pressure from said master cylinder to operate said valve assembly thereby to open said second hydraulic line.

5. An anti-skid brake control system for vehicles according to claim 2, wherein a sealing member is provided between said piston and said housing in a manner spaced from said sealing member; and an oil discharge aperture opened to the exterior is formed in that portion of said housing between said sealing members.

6. An anti-skid brake control system for vehicles according to claim 1, further comprising a hydraulic booster connected to said master cylinder, and another pump-powered hydraulic pressure source for supplying a hydraulic booster pressure into said booster.

7. An anti-skid brake control system for vehicles according to claim 6, wherein said hydraulic booster includes an outlet port and valve means for generating the hydraulic booster pressure into said outlet only during the braking operation; the hydraulic booster pressure generated into said outlet of said booster is supplied into said leak oil flow-preventing valve assembly to operate the leak oil flow-preventing valve assembly, thereby permitting said second hydraulic line to be opened.

8. An anti-skid brake control system for vehicles according to claim 1, wherein said control valve assembly includes an electro-magnetic valve means electrically connected to said skid sensing signal generating means.

9. An anti-skid brake control system for vehicles according to claim 8, wherein said control valve assembly further includes orifice valve means disposed in said first hydraulic line between said electro-magnetic valve means and said hydraulic brake pressure reducing means, for controlling the flow speed of a hydraulic oil flowing through said first hydraulic line, said orifice valve means being electrically connected to said skid sensing signal generating means.

10. An anti-skid brake control system for vehicles according to claim 1, further comprising hydraulic pressure lock valve means disposed in said first hydraulic line between said hydraulic pressure reducing means and said control valve assembly, and lock valve actuating means hydraulically connected to said pump-powered hydraulic pressure source and operated to open said lock valve means in accordance with the hydraulic pressure from said source.

* * * * *